July 31, 1956     H. NOYES ET AL     2,757,025

TANK FITTING WITH MEANS TO RETAIN ATTACHING BOLTS

Filed June 17, 1952     2 Sheets-Sheet 1

INVENTOR.
HOWARD NOYES
EDWARD W. MOORMAN
BY
ATT'Y.

July 31, 1956 H. NOYES ET AL 2,757,025
TANK FITTING WITH MEANS TO RETAIN ATTACHING BOLTS
Filed June 17, 1952 2 Sheets-Sheet 2
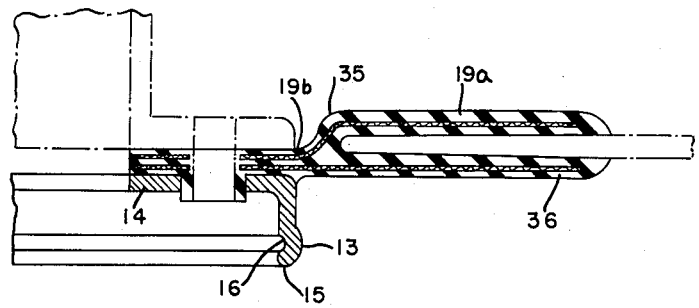
Fig. 3
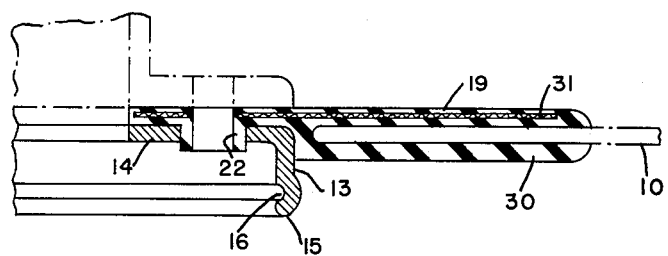
Fig. 4
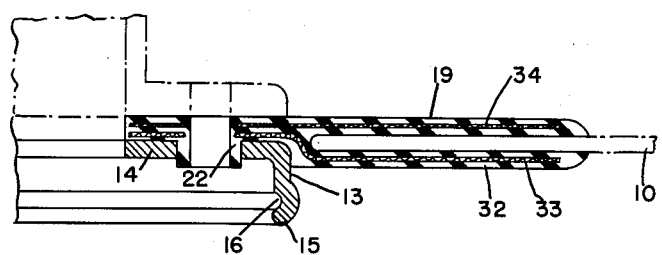
Fig. 5
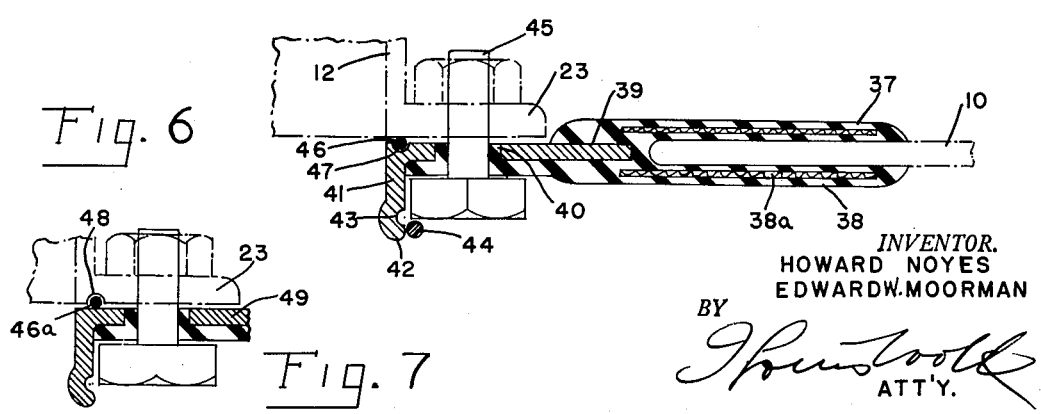
Fig. 6
Fig. 7
INVENTOR.
HOWARD NOYES
EDWARD W. MOORMAN
BY
ATT'Y.

# United States Patent Office 2,757,025
Patented July 31, 1956

2,757,025

TANK FITTING WITH MEANS TO RETAIN ATTACHING BOLTS

Howard Noyes and Edward W. Moorman, Dayton, Ohio, assignors to The Dayton Rubber Company, a corporation of Ohio Application June 17, 1952, Serial No. 294,014

9 Claims. (Cl. 285—200)

The present invention relates to means for securing standard pieces of equipment, such as fuel gauges, outlet flanges, fillercaps, and the like, to the walls of flexible or semi-rigid tanks. The invention is particularly applicable to fittings for fuel and oil containers for aircraft and other vehicles.

Usually in the attachment of such fittings to a tank, the material of the tank adjacent the aperture therein is clamped between two metal rings adapted to form the base to which connections may be secured. The two metal rings are usually clamped together by means of a plurality of bolts with sealing washers or the like being provided to make a liquid-tight joint. Where the fitting is of small dimensions and is more or less inaccessible, some difficulty is experienced in entering the bolts through the apertures of the annular members and also in preventing the bolts from rotating or being dislodged when a nut is being screwed onto the bolt. There are also certain difficulties encountered due to stripping of threads and in replacing nuts. In one conventional type of fitting, female threaded members are molded into rubber rings which are in turn cemented and vulcanized to the tank openings. The equipment to be secured to the openings is then bolted to the female members. If the threads in the female members become stripped, it is difficult to repair or replace these members, especially in the field.

A primary object of the present invention is to provide improved means for overcoming the aforesaid disadvantages in a simple and effective manner.

A further object of the invention is to provide a lightweight fitting of simple construction, ease of interchangeability between bolt or nut, low cost, and positive leakproof action for attachment of the standard pieces of equipment.

A further object of the invention is to provide a fitting having greater shear strength than molded fittings now in use.

Further objects and advantages of the invention will be readily apparent from the following detailed description taken in connection with the accompanying drawing showing several embodiments of the invention as applied to the attachment of a pipe to a self-sealing flexible fuel tank for aircraft.

Figures 3, 4, 5 and 6 are partial sectional views showing modified forms of the fitting shown in Figure 1, taken along the same plane as Figure 2.

Figure 7 is a fragmentary cross section showing a modified form of the invention illustrated in Figure 6.

Figure 1:
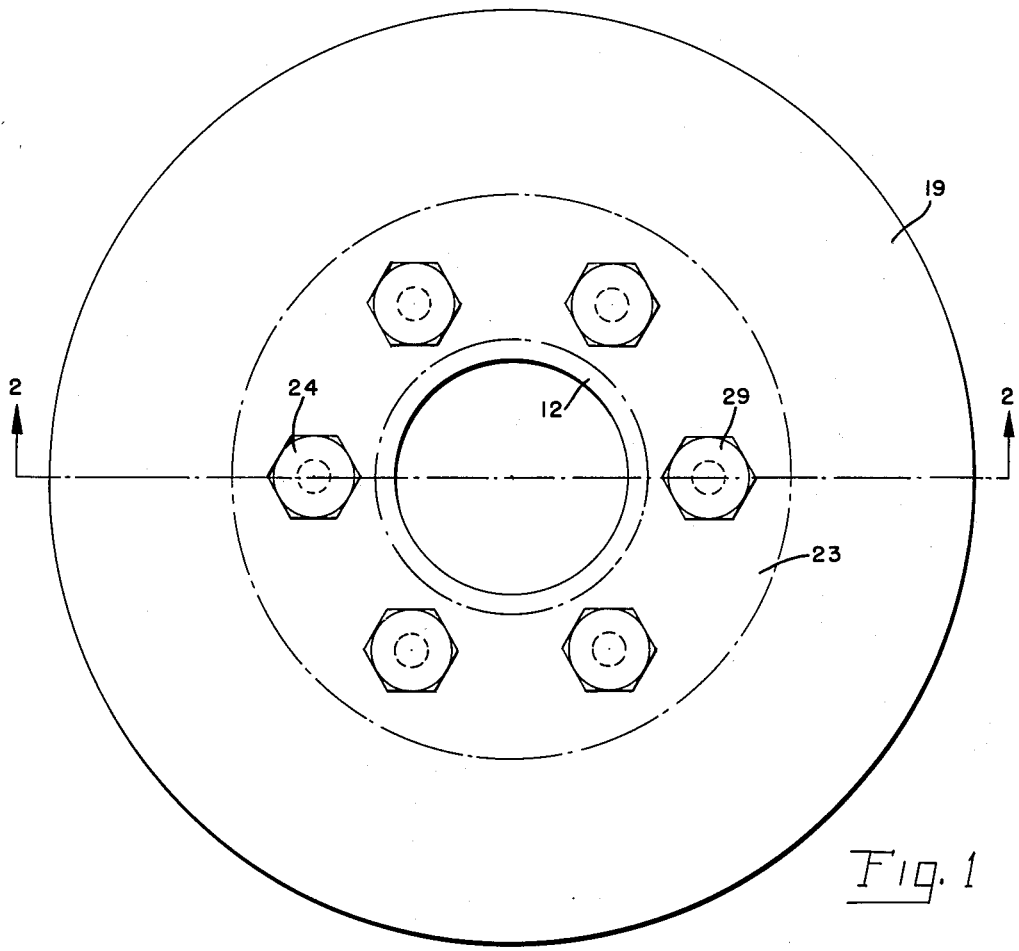
Figure 1 is a top plan view of a tank fitting embodying the present invention.
Figure 2:
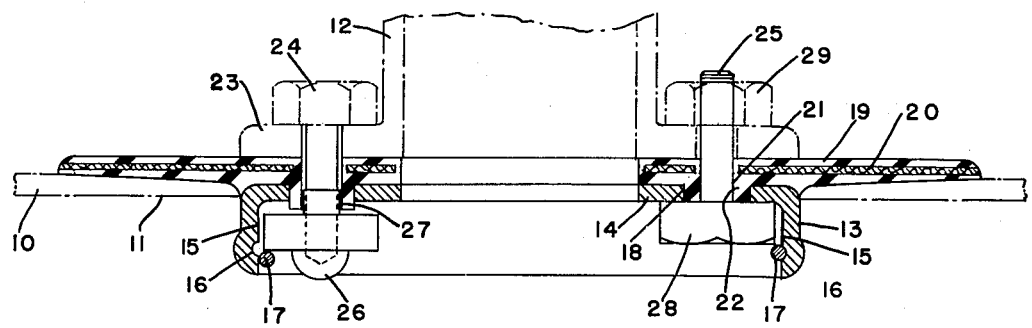
Figure 2 is a cross-sectional view taken along line 2—2 of Figure 1.

Referring to the drawing and particularly to Figures 1 and 2, numeral 10 indicates a wall of a conventional fuel tank and having a margin 11 surrounding an opening wherein an attachment 12 is secured.

The improved fitting consists of an annular metal ring 13 comprising a horizontal wall 14 and a depending vertical wall 15, the lower portion of which is deformed to provide a groove 16 for receiving a retaining wire ring or loop 17. The horizontal wall 14 is provided with a plurality of holes or openings 18. An annular rubber member 19 having a fabric core 20, is molded to or adhesively secured to the wall 14. Bolt receiving holes 21 are provided in the rubber member 19 in such manner as to form protrusions 22 in the form of rubber sleeves, extending through the holes 18 in the metal ring, and projecting slightly beyond the openings.

The attachment or external fitting 12 having the usual apertured flange 23 is attached to the fitting by means of several cap screws 24 or studs 25. Each of these is illustrated in Figure 2, although all of either type would ordinarily be used. The cap screw 24 threads into a blind tapped dome nut 26 held in place by a shoulder 27 extending into hole 20, and the retaining wire 17. The dome nut 26 is prevented from turning by means of a flat surface thereon bearing against the inner surface of wall 15. The head 28 of the stud 25 has a flat surface bearing against the inner surface of wall 15 to prevent rotation of the stud while applying the nut 29.

In use, the vertical wall of the fitting is inserted in the tank opening, the annular metal ring being slightly smaller than the opening as shown in Figure 1, and the under side of the rubber flange 19 cemented to the tank wall. The attachment is then bolted to the annular metal ring in the customary manner. Leakage around the cap screws or studs is prevented by the rubber sleeves 22 extending through the openings and being compressed when the nuts are tightened. It will be noted that the reinforcing fabric material is embedded in rubber and there will be no leakage by wicking or capillary action. The reinforcing fabric referred to may be square-woven cotton, rayon, or nylon fabric, preferably treated like a latex dip to promote adhesion to rubber.

The slightly modified form of fitting shown in Figure 4 has the identical parts shown in Figure 1 except for the additional interior rubber flange indicated by numeral 30. This construction is particularly adapted for tank walls of increased thickness. The two flanges are cemented to opposite sides of the tank wall at the opening as clearly seen in Figure 4.

The slightly modified form shown in Figure 5 is the same as shown in Figure 4 except that the interior flange 31 also includes reinforcing fabric 32 for increased strength.

The fitting shown in Figure 3 incorporates the same features disclosed in Figure 5, except that the upper rubber flange 19a is indented at 19b adjacent the annular ring to accommodate the fitting.

Figure 6 illustrates an additional modification which differs from the forms shown in Figures 2 to 5, inclusive, in certain respects. In this form, the annular metal ring has a horizontal portion 39 engaged by the flange 19 of fitting 12, and a vertical depending portion 41 which terminates in a grooved lip 42 having ring retaining groove 43 formed therein. This depending portion is positioned between the bolt 45 and the tank opening rather than on the other side thereof as in Figures 1 to 5, inclusive. The tank wall is shown at 10, engaged between rubber gasket flanges 37 and 38. Fabric reinforcement 38a may be incorporated in flange 38 if desired. The rubber gasket forms a sleeve 40 which extends through the opening in the annular ring and which receives the bolt. The head of the bolt is kept from dropping by means of retaining ring 44 which is shown just below the groove 43 into which it is inserted after the nut on the bolt has been tightened. The surface of the horizontal portion of the annular ring has an annular groove 47 formed therein to receive O` ring or similar gasket 46 which is compressed when the bolt is tightened to serve as an additional precaution against leakage at that point.

In Figure 7 is shown a modification of Figure 6 wherein the O ring 46a is positioned within a groove 48 in the fitting flange to provide sealing between fitting flange 23 and flange 49.

From the foregoing description, it is readily apparent that the present apparatus is well adapted to accomplish the objects and advantages set forth. It is obvious that minor changes may be made in the details of construction and design of the above-described embodiment of the invention without departing from the spirit thereof, such changes being restricted only by the scope of the following claims.

We claim:

1. Means for securing attachments to a fluid container having an aperture, comprising an annular member having a horizontal wall and a depending vertical wall adapted to fit within said aperture, said depending vertical wall having a retaining wire mounted thereon, an annular rubber member having a portion thereof overlying and secured to the upper surface of said annular member and having a second portion adapted to extend over the wall of the container surrounding said aperture and adapted to be secured to said wall, a plurality of openings spaced around and formed in said annular member and said first portion of the rubber member, the walls of said openings in said rubber member forming sleeves extending into the openings in the annular member and headed fasteners extending through said openings, said fasteners being held against vertical displacement by contact of their head with said retaining wire and against lateral or rotative movement by the contact of a flat side of their head against said vertical wall.

2. A fitting for a container, adapted for securing an attachment to an opening in said container, comprising a first member for attachment over the edge of said opening and coextensive therewith, a second member having a portion coextensive with said first member and attached thereto and having a portion depending therefrom into said opening, said depending portion being grooved for the insertion of a retaining ring, openings through said first and second members and headed fastening members for said attachment extending therethrough, and a retaining ring positioned in said groove engaging the heads of said fastening members to prevent them from dropping into the container.

3. In combination with a container, a fitting attached to the margin of an opening in said container, said fitting comprising a flat ring of resilient rubber-like material having its outer portion attached around said margin and its inner portion extending over said opening, a metal member having a portion coextensive with said inner portion of said ring and attached thereto and a depending portion projecting beneath said opening, openings in said metal member and said ring for the attachment of a member to said fitting by means of individually removable headed fastening members extending through said openings, and retaining means associated with the depending portion of said metal member engaging the heads of said fastening members to prevent them from falling into said container wherein the retaining means consists of a groove in the depending portion and a ring positioned in said groove.

4. The combination with a container and a fitting therefor according to claim 3 wherein the individually removable fastening members extending through the openings are bolts having heads engaged by the retaining means.

5. The combination with a container and a fitting therefor according to claim 3 wherein the flat ring of resilient material is formed with an outer portion extending both above and below the edge of the opening and fastened thereto.

6. A container and a fitting therefor according to claim 5 wherein the flat resilient ring contains fabric reinforcing means embedded therein.

7. The combination of a container and a fitting therefor according to claim 3 wherein the metal member contains a groove concentric therewith formed in the same plane as the resilient ring and having a resilient gasket in the form of an O ring positioned in said groove adapted to be engaged by a member attached to said fitting, said depending portion is positioned between said fastening members and the margin of said opening, and said portion of said metal member which is coextensive with said flat ring extends beyond the member attached to said fitting.

8. The combination with a container and fitting therefor according to claim 3 wherein the metal member has a resilient gasket in the form of an O ring positioned thereon in the same plane as the flat resilient ring, said O ring adapted to engage a corresponding groove on the member attached to said fitting, said depending portion is positioned between said fastening members and the margin of said opening, and said portion of said metal member which is coextensive with said flat ring extends beyond the member attached to said fitting.

9. A fitting for attaching a fixture to a container or the like comprising an annular member having a horizontal wall and a vertical wall depending therefrom, spaced openings in said horizontal wall in registry with similarly spaced openings associated with said container, headed fasteners having vertical extensions at least partially through said openings to hold said fasteners against horizontal displacement relative to said vertical wall and a gang retaining ring bearing against said vertical wall directly beneath said fasteners and in contact with the heads thereof, said retaining ring holding said fasteners against vertical displacement whereby the fasteners, though individually removable, will be securely held in the desired registry with said openings for the attachment of said fixtures or the like thereto.

References Cited in the file of this patent

UNITED STATES PATENTS

| | | |
|---|---|---|
| 1,045,389 | Gillmor et al. | Nov. 26, 1912 |
| 1,396,135 | Meriwether | Nov. 8, 1921 |
| 1,429,350 | Ihrig | Sept. 19, 1922 |
| 2,326,263 | Steiner | Aug. 10, 1943 |
| 2,336,885 | Pepersack | Dec. 14, 1943 |
| 2,371,633 | Lippincott | Mar. 20, 1945 |
| 2,374,548 | Leisure | Apr. 24, 1945 |
| 2,441,009 | Cunningham | May 4, 1948 |
| 2,460,613 | Whelan et al. | Feb. 1, 1949 |
| 2,462,023 | Johanson et al. | Feb. 15, 1949 |
| 2,472,421 | Hamill | June 7, 1949 |

FOREIGN PATENTS

| | | |
|---|---|---|
| 7225/32 | Australia | May 3, 1933 |